(12) United States Patent
Hashimura et al.

(10) Patent No.: US 8,092,627 B2
(45) Date of Patent: Jan. 10, 2012

(54) MANUFACTURING METHOD FOR PNEUMATIC TIRE

(75) Inventors: Yoshiaki Hashimura, Hiratsuka (JP); Yoshiaki Kirino, Hiratsuka (JP); Norifumi Kameda, Hiratsuka (JP)

(73) Assignee: The Yokohoma Rubber Co., Ltd., Tokyo (JP)

( * ) Notice: Subject to any disclaimer, the term of this patent is extended or adjusted under 35 U.S.C. 154(b) by 333 days.

(21) Appl. No.: 12/521,668

(22) PCT Filed: Feb. 19, 2008

(86) PCT No.: PCT/JP2008/052739
§ 371 (c)(1),
(2), (4) Date: Jun. 29, 2009

(87) PCT Pub. No.: WO2008/102763
PCT Pub. Date: Aug. 28, 2008

(65) Prior Publication Data
US 2010/0314030 A1 Dec. 16, 2010

(30) Foreign Application Priority Data
Feb. 22, 2007 (JP) .................. 2007-042649

(51) Int. Cl.
*B29D 30/08* (2006.01)
*B60C 5/14* (2006.01)
(52) U.S. Cl. ........ 156/154; 156/123; 156/133; 156/201; 152/510
(58) Field of Classification Search ................. 156/121, 156/123, 126, 130.3, 130.7, 133, 134, 201, 156/406.4; 152/510
See application file for complete search history.

(56) References Cited

U.S. PATENT DOCUMENTS
2,234,065 A * 3/1941 Vogt .............................. 383/210
(Continued)

FOREIGN PATENT DOCUMENTS
JP     A 8-217923     8/1996
(Continued)

*Primary Examiner* — Richard Crispino
*Assistant Examiner* — Martin Rogers
(74) *Attorney, Agent, or Firm* — Greer, Burns & Crain, Ltd.

(57) ABSTRACT

Provided is a manufacturing method for a pneumatic tire including the steps of: shaping a cylindrical film formed of a thermoplastic resin or a thermoplastic elastomer composite in which a thermoplastic resin is blended with an elastomer, folding the film into a sheet shape, laminating rubber layers on both surfaces of the folded film, opening the laminate of the film and the rubber layers into a cylindrical shape, fitting the laminate thus opened on a tire making drum, forming the tire pneumatic tire including the film as an air permeation preventing layer, and curing the uncured tire. In the method, when the rubber layers are laminated on the both surfaces of the folded film, positions of the rubber layers in a width direction are displaced from each other such that an end portion of one of the rubber layers is arranged to protrude from an end portion of the film and an end portion of the other one of the rubber layer is arranged on an inner side, in the width direction, of the protruding end portion of the one of the rubber layers, and the protruding end portion of the one of the rubber layers is caused to cover the end portion of the other one of the rubber layers in a state where the laminate is fitted on the tire making drum. By employing the manufacturing method for the pneumatic tire, troubles due to a splice portion of the rubber layers can be reduced.

6 Claims, 3 Drawing Sheets

U.S. PATENT DOCUMENTS 3,396,545 A * 8/1968 Lamberton ................. 405/233
5,615,979 A * 4/1997 Lin .............................. 405/289

FOREIGN PATENT DOCUMENTS

| JP | A 10-29248 | 2/1998 |
| JP | A 11-199713 | 7/1999 |
| JP | A 2000-272023 | 10/2000 |
| JP | A 2001-219478 | 8/2001 |
| JP | A 2001-260137 | 9/2001 |

* cited by examiner

MANUFACTURING METHOD FOR PNEUMATIC TIRE

This application is a U.S. National Phase under 35 U.S.C. §371 of International Application No. PCT/JP2008/052739, filed Feb. 19, 2008.

TECHNICAL FIELD

The present invention relates to a manufacturing method for a pneumatic tire using, as an air permeation preventing layer, a film formed of a thermoplastic resin or a thermoplastic elastomer composite in which a thermoplastic resin is blended with an elastomer, and more specifically relates to a manufacturing method for a pneumatic tire that can reduce troubles due to a splice portion of rubber layers when a laminate of the film and the rubber layers are used as an intermediate member.

BACKGROUND ART

Recently, it has been proposed that a film formed of a thermoplastic resin or a thermoplastic elastomer composite in which a thermoplastic resin is blended with an elastomer be arranged as an air permeation preventing layer on an inner surface of a tire (for example, see Patent Documents 1 and 2).

A pneumatic tire including such an air permeation preventing layer is manufactured in a following step: a cylindrical film formed of a thermoplastic resin or a thermoplastic elastomer composite in which a thermoplastic resin is blended with an elastomer is shaped; the film is folded into a sheet shape; rubber layers are laminated on both surfaces of the folded film; then the laminate of the film and the rubber layers is opened into a cylindrical shape and is fitted on a tire making drum thereby forming an uncured tire (for example, see Patent Documents 3 and 4). When the laminate of the film and the rubber layers is used, there is an advantage that handling of an intermediate member becomes easy and the workability improves.

However, the bonding between end portions of the rubber layers at end portions of the folded film in the width direction is not necessarily sufficient when the rubber layers are laminated on the both surfaces of the folded film. In such case, there is a problem that troubles are caused due to separation of the rubber layers at a splice portion in a state where the laminate is fitted on the tire making drum. The splice portion of the rubber layers hardly opens if the width of the rubber layer laminated on the film is set to be large. In this case, however, the splice portion of the rubber layers protrudes in the radial direction of the drum in the state where the laminate is fitted on the tire making drum. As a result, an air pocket is easily formed in the vicinity of the splice portion when another tire component is wound.

Patent Document 1: Japanese patent application Kokai publication No. 8-217923
Patent Document 2: Japanese patent application Kokai publication No. 11-199713
Patent Document 3: Japanese patent application Kokai publication No. 10-29248
Patent Document 4: Japanese patent application Kokai publication No. 2001-260137

DISCLOSURE OF THE INVENTION

Problem to be Solved by the Invention

An object of the present invention is to provide a manufacturing method for a pneumatic tire that can reduce troubles due to a splice portion of rubber layers, when a film formed of a thermoplastic resin or a thermoplastic elastomer composite in which a thermoplastic resin is blended with an elastomer is used as an air permeation preventing layer, and when a laminate of the film and the rubber layer is used as an intermediate member.

Means for Solving the Problem

In order to achieve the object, the present invention provides a manufacturing method for a pneumatic tire including the steps of: shaping a cylindrical film formed of a thermoplastic resin or a thermoplastic elastomer composite in which a thermoplastic resin is blended with an elastomer, folding the film into a sheet shape, laminating rubber layers on both surfaces of the folded film, opening the laminate of the film and the rubber layers into a cylindrical shape, fitting the laminate thus opened on a tire making drum, forming an uncured tire including the film as an air permeation preventing layer, and curing the uncured tire, the method characterized in that, when the rubber layers are laminated on the both surfaces of the folded film, positions of the rubber layers in a width direction are displaced from each other such that an end portion of one of the rubber layers is arranged to protrude from an end portion of the film and an end portion of the other one of the rubber layers is arranged on an inner side, in the width direction, of the protruding end portion of the one of the rubber layers, and the protruding end portion of the one of the rubber layers is caused to cover the end portion of the other one of the rubber layers in a state where the laminate is fitted on the tire making drum.

Effect of the Invention

In the present invention, when using the film formed of the thermoplastic resin or the thermoplastic elastomer composite as the air permeation preventing layer, the cylindrical film is shaped, the film is folded into the sheet shape, and the rubber layers are laminated on the both surfaces of the folded film. When the rubber layers are laminated on the both surfaces of the folded film, the positions of the rubber layers in the width direction are displaced from each other such that the end portion of the one of the rubber layers is arranged to protrude from the end portion of the film and the end portion of the other of the rubber layers is arranged on the inner side, in the width direction, of the protruding end portion of the one of the rubber layers, and the protruding end portion of the one of the rubber layers is caused to cover the end portion of the other one of the rubber layers in the state where the laminate is fitted on the tire making drum. Accordingly, the end portions of the rubber layers are bonded easily and firmly, and the splice portion of the rubber layers hardly separates in the state where the laminate is fitted on the tire making drum. In addition, since the protruding end portion of the one of the rubber layers covers the end portion of the other one of the rubber layers, the splice portion of the rubber layers protrudes little in the radial direction of the drum in the state where the laminate is fitted on the tire making drum, and an air pocket is hardly formed in the vicinity of the splice portion when another tire component is wound. Thus, troubles due to the splice portion of the rubber layers can be reduced when the laminate of the film and the rubber layers are used as an intermediate member.

In the present invention, it is preferable that a relation of $L2-L1>3$ mm be satisfied, where $L1$ represents a protrusion amount of the end portion of the other one of the rubber layers from the end portion of the film and $L2$ represents a protrusion amount of the end portion of the one of the rubber layers from the end portion of the film. By providing a sufficient difference between the protrusion amounts L1 and L2 in this manner, troubles due to the splice portion of the rubber layers can be reduced effectively. For the same reason, the protrusion amount L1 preferably ranges from −50 mm to +2 mm or more preferably from −10 mm to +2 mm, and the protrusion amount L2 preferably ranges from +3 mm to +60 mm or more preferably from +3 mm to +15 mm. The protrusion amounts L1 and L2 are positive values when the end portions of the rubber layers protrude from the end portion of the film, and are negative values when the end portions of the rubber layers do not protrude (are positioned inner in the width direction) from the end portion of the film.

DESCRIPTION OF THE REFERENCE NUMERALS

1 TREAD PORTION
2 SIDE WALL
3 BEAD PORTION
4 CARCASS LAYER
5 BEAD CORE
6 BELT LAYER
7 AIR PERMEATION PREVENTING LAYER
11 FILM
11a, 11b END PORTION OF FILM
12 RUBBER LAYER (LOWER SIDE)
12a, 12b END PORTION OF RUBBER LAYER
13 RUBBER LAYER (UPPER SIDE)
13a, 13b END PORTION OF RUBBER LAYER

BEST MODES FOR CARRYING OUT THE INVENTION

Figure 1:
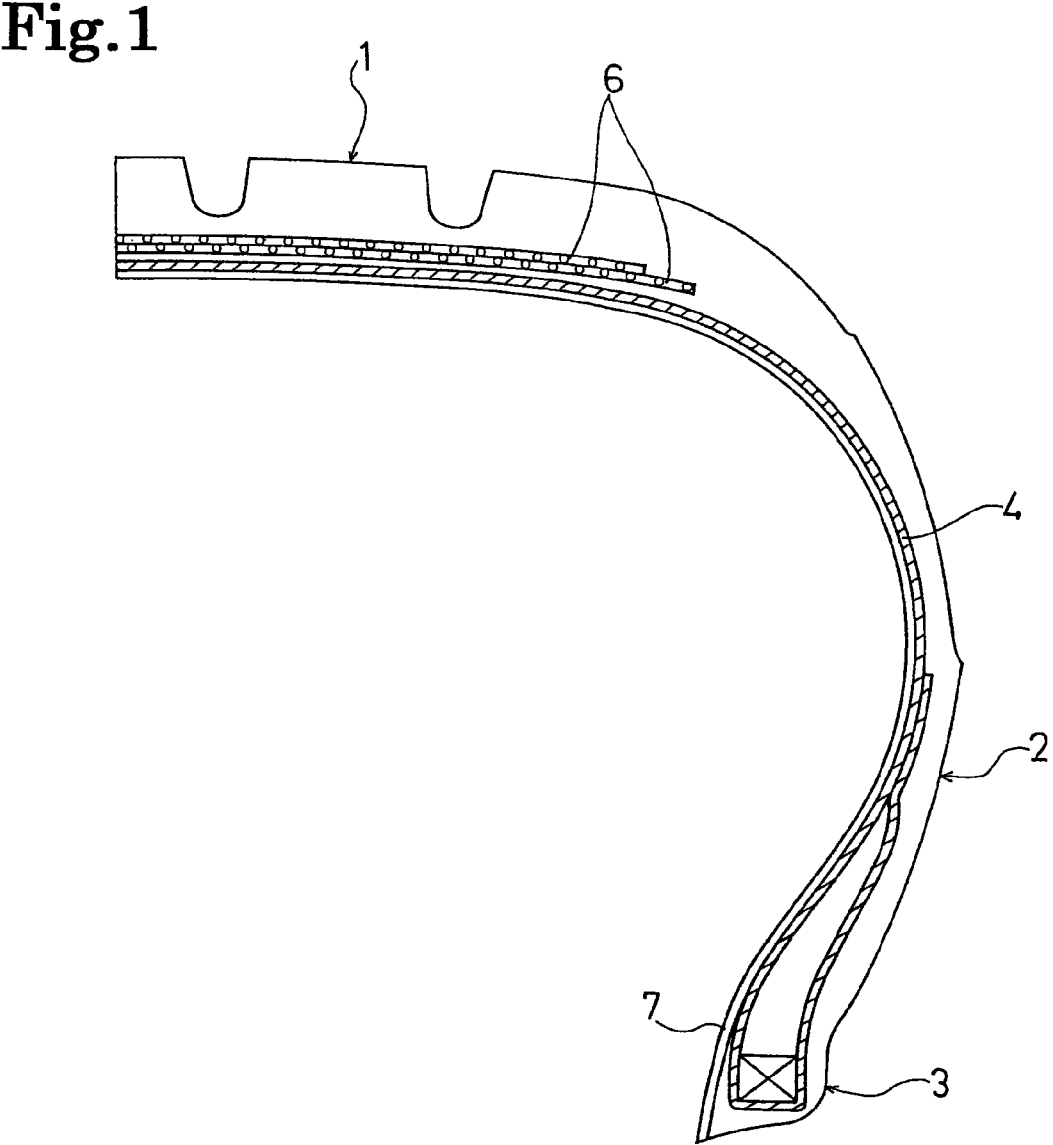
FIG. 1 is a meridian half sectional view showing a pneumatic tire according to an embodiment of the present invention.

Hereinafter, a configuration of the present invention will be described in detail with reference to the accompanying drawings. FIG. 1 shows a pneumatic tire according to an embodiment of the present invention. Reference numeral 1 denotes a tread portion, reference numeral 2 denotes a side wall portion, and reference numeral 3 denotes a bead portion. A carcass layer 4 is mounted to a pair of the left and right bead portions 3, and an end portion of the carcass layer 4 is folded back around a bead core 5 from the inside to the outside of a tire. Multiple belt layers 6 are embedded on the outer circumference side of the carcass layer 4 in the tread portion 1. In the belt layers 6, reinforcement codes are arranged to be inclined with respect to the circumferential direction of the tire, and to alternately intersect with each other among the layers.

In the pneumatic tire, an air permeation preventing layer 7 is arranged on an inner cavity side of the tire with respect to the carcass layer 4. The air permeation preventing layer 7 is configured of a laminate of rubber layer and a film formed of a thermoplastic resin or a thermoplastic elastomer composite.

Figure 2:
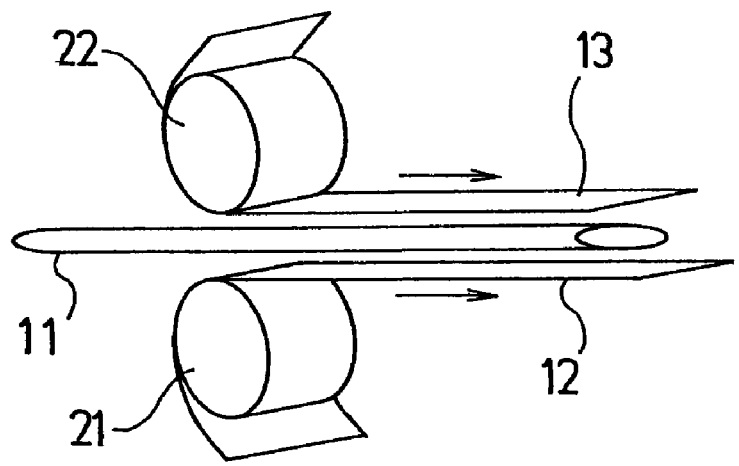
FIG. 2 is a perspective view showing a manufacturing method for a laminate of a film and rubber layers according to the embodiment of the present invention.
Figure 3:
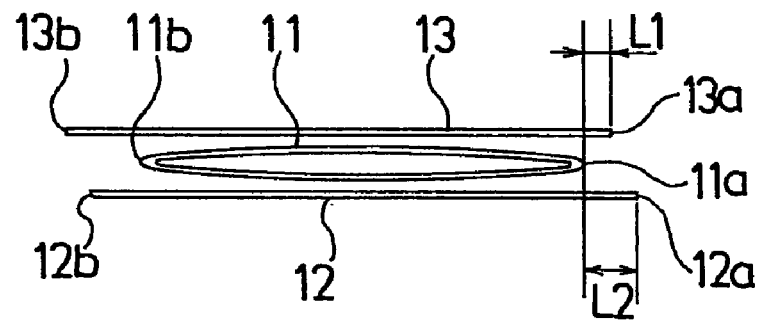
FIG. 3 is a front view schematically showing the laminate of the film and the rubber layers.
Figure 4:
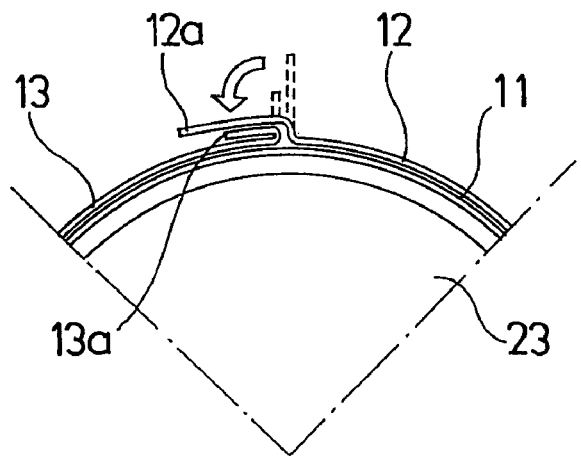
FIG. 4 is a side view showing one example of a state where the laminate of the film and the rubber layers is fitted on a tire making drum.

Next, a manufacturing method for the pneumatic tire described above will be described. FIG. 2 is a perspective view showing a manufacturing method for the laminate of the film and the rubber layers according to the embodiment of present invention. FIG. 3 is a front view schematically showing the laminate of the film and the rubber layers. FIG. 4 is a side view showing one example of a state where the laminate of the film and the rubber layers is fitted on a tire making drum.

In FIG. 2, a cylindrical film 11, which is folded into a sheet shape, is continuously supplied between a pair of rollers 21 and 22. On both surfaces of the folded film 11, rubber layers 12 and 13 are laminated respectively by the rollers 21 and 22. Accordingly, a laminate of the film 11 and the rubber layers 12 and 13 can easily be obtained. Note that, although the rubber layers 12 and 13 are drawn as if apart from the film 11 for an easier understanding, they form an integrally laminated sheet member.

As shown in FIG. 3, when the rubber layers 12 and 13 are laminated on both the upper and lower surfaces of the folded film 11, the positions of the rubber layers 12 and 13 are displaced from each other in the width direction of the rubber layers 12 and 13. Specifically, an end portion 12a of the rubber layer 12 on the lower side is arranged to protrude from an end portion 11a of the film 11, and an end portion 13a of the rubber layer 13 on the upper side is arranged on the inner side, in the width direction, of the end portion 12a of the rubber layer 12. More specifically, the relation is set to satisfy L2−L1>3 mm, where L1 represents a protrusion amount of the end portion 13a of the rubber layer 13 from the end portion 11a of the film 11 and L2 represents a protrusion amount of the end portion 12a of the rubber layer 12 from the end portion 11a of the film 11. Meanwhile, regarding an end portion 11b on the opposite side of the film 11, an end portion 13b of the rubber layer 13 on the upper side is arranged to protrude from the end portion 11b of the film 11, and an end portion 12b of the rubber layer 12 on the lower side is arranged on the inner side, in the width direction, of the end portion 13b of the rubber layer 13.

After the laminate of the film 11 and the rubber layers 12 and 13 is shaped in this manner, the laminate of the film 11 and the rubber layers 12 and 13 is opened into a cylindrical shape and is fitted on a tire making drum 23, as shown in FIG. 4. At this time, since the rubber layers 12 and 13 are laminated with respect to the film 11 such that the protrusion amount L1 is relatively smaller than the protrusion amount L2, the protrusion amount of the end portion 12a of the rubber layer 12 from an outer circumference surface of the tire making drum 23 is relatively large and the protrusion amount of the end portion 13a of the rubber layer 13 from the outer circumference surface of the tire making drum 23 is relatively small, in the state where the laminate is fitted on the tire making drum 23. As a consequence, the end portion 12a of the rubber layer 12 tends to easily fall on and cover the end portion 13a of the rubber layer 13.

Therefore, the end portions of the rubber layers 12 and 13 are joined easily and firmly by pressure-bonding the end portions of the rubber layers 12 and 13 while rotating the tire making drum 23 or by pressure-bonding the end portions of the rubber layers 12 and 13 in a state where the tire making drum 23 is stopped. As a result, a splice portion of the rubber layers 12 and 13 hardly opens in the state where the laminate is fitted on the tire making drum 23. In addition, since the splice portion of the rubber layers 12 and 13 protrudes little in the radial direction of the drum, an air pocket is hardly formed in the vicinity of the splice portion when another tire component is wound. Thus, troubles due to the splice portion of the rubber layers 12 and 13 can be reduced when the laminate of the film 11 and the rubber layers 12 and 13 are used as an intermediate member.

In the manufacturing method described above, the relation is set to satisfy L2−L1>3 mm, where L1 represents the protrusion amount of the end portion 13a of the rubber layer 13 from the end portion 11a of the film 11 and L2 represents the protrusion amount of the end portion 12a of the rubber layer 12 from the end portion 11a of the film 11. By providing a sufficient difference between the protrusion amounts L1 and L2 in this manner, troubles due to the splice portion of the rubber layers 12 and 13 can be reduced effectively. The protrusion amount L1 is preferably −50 mm to +2 mm, and more preferably −10 mm to +2 mm. The protrusion amount L2 is preferably +3 mm to +60mm, and more preferably +3mm to +15mm. If the protrusion amount L1 is too small, wrinkles are easily formed in the film since a portion of the film on which the rubber layer is not laminated becomes large. On the other hand, if the protrusion amount L1 is too large, it becomes difficult to cause the end portion of the rubber layer to fall in a predetermined direction. Moreover, if the protrusion amount L2 is too small, it becomes difficult to cause the end portion of the rubber layer to fall in the predetermined direction. On the other hand, if the protrusion amount L2 is too large, wrinkles are easily formed in the rubber layer when the end portion of the rubber layer is caused to fall.

Figure 5:
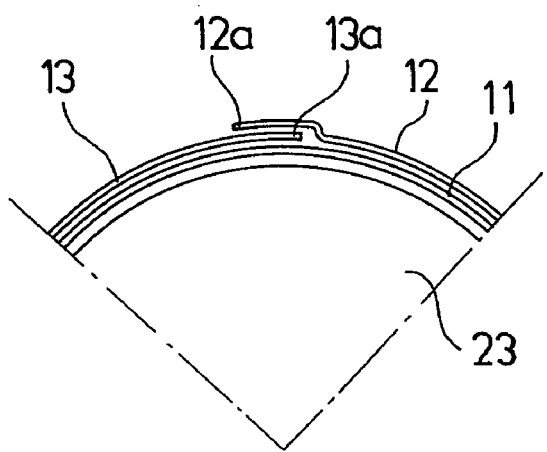
FIG. 5 is a side view showing a modified example of the state where the laminate of the film and the rubber layers is fitted on the tire making drum.

Note that FIG. 4 shows a case where the protrusion amounts L1 and L2 both take a positive value. For example, when L1=0 mm and L2=10 mm, the splice portion shown in FIG. 5 is formed.

The pneumatic tire in which the film serves as the air permeation preventing layer is obtained by performing the following step: opening the laminate of the film and the rubber layers into the cylindrical shape and is fitted on the tire making drum in the manner described above; then bonding tire components such as the carcass layer, the bead core, a bead filler, and a side wall rubber on the laminate to form a first green tire; bonding the belt layer and a tread rubber while expanding the diameter of the first green tire toroidally to form a second green tire; and then curing the second green tire.

Figure 6:
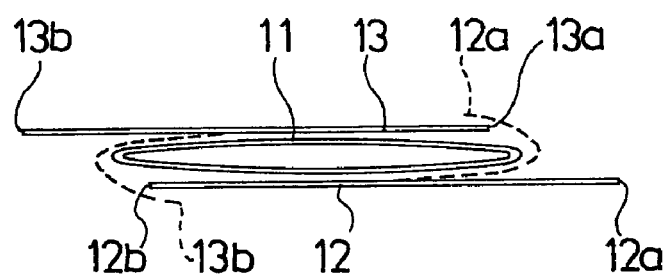
FIG. 6 is a front view showing a manufacturing method for a laminate of a film and rubber layers according to another embodiment of the present invention.

FIG. 6 shows a front view of a manufacturing method for a laminate of a film and rubber layers according to another embodiment of the present invention. In the first embodiment described above, the laminate of the film and the rubber layers is shaped and then fitted on the tire making drum, so that a pressure-bonding work of end portions of the rubber layers is performed in this state. However, the pressure-bonding work may be performed in advance before shaping the tire.

In FIG. 6, after the laminate of the film 11 and the rubber layers 12 and 13 has been formed, the film 11 is rotated along the cylinder so that the end portion 12a of the rubber layer 12 on the lower side is superimposed on the end portion 13a of the rubber layer 13 on the upper side, and the end portion 13b of the rubber layer 13 on the upper side is superimposed on the end portion 12b of the rubber layer 12 on the lower side. Obviously, it is preferable to not only superimpose but also pressure-bond the end portions of the rubber layers 12 and 13. In this case, the laminate of the film 11 and the rubber layers 12 and 13 can be supplied as the intermediate member having excellent shape stability in a tire shaping step.

In the manufacturing method for a pneumatic tire described above, the thickness of the film 11 is not particularly limited, and may be selected from a range of 0.002 mm to 0.7 mm. The thicknesses of the rubber layers 12 and 13 are not particularly limited, and may be selected from a range of 0.1 mm to 3.0 mm. The end portions of the rubber layers 12 and 13 in width direction may be cut obliquely in order to improve the bonded state of the end portions of the rubber layers 12 and 13.

Hereinafter, the film used in the present invention will be described. The film may be configured of a thermoplastic resin or a thermoplastic elastomer composite in which an elastomer is blended in a thermoplastic resin.

Examples of the thermoplastic resin used in the present invention include polyamide-based resins (for example, Nylon 6 (N6), Nylon 66 (N66), Nylon 46 (N46), Nylon 11 (N11), Nylon (N12), Nylon 610 (N610), Nylon 612 (N612), Nylon 6/66 copolymer (N6/66), Nylon Jun. 66, 19610 copolymer (N6/66/610), Nylon MXD6, Nylon 6T, Nylon 6/6T copolymer, Nylon 66/PP copolymer, and Nylon 66/PPS copolymer), polyester-based resins (for example, aromatic polyesters such as polybutylene terephthalate (PBT), polyethylene terephthalate (PET), polyethylene isophthalate (PEI), polybutylene terephthalate/tetramethylene glycol copolymer, PET/PEI copolymer, polyarylate (PAR), polybutylene naphthalate (PBN), liquid crystal polyester, and polyoxyalkylene diimide acid/polybutylene terephthalate copolymer), polynitrile-based resins (for example, polyacrylonitrile (PAN), polymethacrylonitrile, acrylonitrile/styrene copolymer (AS), methacrylonitrile/styrene copolymer, and methacrylonitrile/styrene/butadiene copolymer), poly(metha) acrylate-based resins (for example, polymethyl methacrylate (PMMA), polyethyl methacrylate, ethylene ethyl acrylate copolymer (EEA), ethylene acrylic acid copolymer (EAA), and ethylene methyl acrylate resin (EMA)), polyvinyl-based resins (for example, vinyl acetate (EVA), polyvinyl alcohol (PVA), ethylene vinyl alcohol copolymer (EVOH), polyvinylidene chloride (PVDC), polyvinyl chloride (PVC), vinyl chloride/vinylidene chloride copolymer, and vinylidene chloride/methyl acrylate copolymer), cellulose-based resins (for example, cellulose acetate and cellulose acetate butyrate), fluorine-based resins (for example, polyvinylidene fluoride (PVDF), polyvinyl fluoride (PVF), polychlorotrifluoroethylene (PCTFE), and tetrafluoroethylene/ethylene copolymer (ETFE)), and imide-based resins (for example, aromatic polyimide (PI)).

Examples of the elastomer used in the present invention include diene-based rubbers and hydrogenated diene rubbers (for example, NR, IR, epoxidized natural rubber, SBR, BR (high-cis BR and low-cis BR), NBR, hydrogenated NBR, and hydrogenated SBR), olefin-based rubbers (for example, ethylene propylene rubber (EPDM or EPM) and maleic acid modified ethylene propylene rubber (M-EPM)), butyl rubber (IIR), copolymer of isobutylene and aromatic vinyl or diene-based monomer, acrylic rubber (ACM), ionomer, halogen-containing rubbers (for example, Br-IIR, Cl-IIR, bromide of isobutylene paramethylstyrene copolymer (Br-IPMS), chloroprene rubber (CR), hydrin rubber (CHC or CHR), chlorosulfonated polyethylene (CSM), chlorinated polyethylene (CM), and maleic acid modified chlorinated polyethylene (M-CM)), silicone rubbers (for example, methylvinyl silicone rubber, dimethyl silicone rubber, and methylphenylvinyl silicone rubber) sulfur-containing rubbers (for example, polysulfide rubber), fluororubbers (for example, vinylidene fluoride-based rubber, fluorine-containing vinyl ether-based rubber, tetrafluoroethylene-propylene-based rubber, fluorine-containing silicon-based rubber, and fluorine-containing phosphagen-based rubber), and thermoplastic elastomers (for example, styrene-based elastomer, olefin-based elastomer, polyester-based elastomer, urethane-based elastomer, and polyamide-based elastomer).

In the thermoplastic elastomer composite used in the present invention, the composition ratio of a thermoplastic resin component (A) and an elastomer component (B) may be determined appropriately in consideration of the balance in thickness or flexibility of the film, and ranges preferably from 10/90 to 90/10 and more preferably from 20/80 to 85/15 (parts by weight).

In the thermoplastic elastomer composite according to the present invention, another polymer, such as a compatibilizer, and a compounding agent may be mixed as a third component in addition to the essential components (A) and (B). The purpose of mixing another polymer is to improve the compatibility between the thermoplastic resin component and the elastomer component, to improve the film shaping workability of the material, to improve heat resistance, to reduce cost, or the like. Examples of the material used therefor include polyethylene, polypropylene, polystyrene, ABS, SBS, and polycarbonate.

The thermoplastic elastomer composite is obtained by melting and kneading the thermoplastic resin and the elastomer (uncured substance in the case of rubber) in advance with a twin screw extruder or the like to disperse the elastomer component in the thermoplastic resin forming a continuous phase. When curing the elastomer component, a curing agent may be added during kneading to dynamically cure the elastomer. Various compounding agents (excluding the curing agent) for the thermoplastic resin or the elastomer component may be added during the kneading, but are preferably mixed in advance before the kneading. A kneading machine to be used in kneading the thermoplastic resin and the elastomer is not particularly limited, and may be a screw extruder, a kneader, a Banbury mixer, a twin screw extruder, or the like. Of these, it is preferable to use the twin screw extruder for kneading a resin component and a rubber component and for dynamically vulcanizing of the rubber component. Further, two or more types of kneading machines may be used for sequential kneading. As a condition for the melting and kneading, a temperature at which the thermoplastic resin melts or greater suffices. The shear rate at the time of kneading is preferably 2500 to 7500 $\sec^{-1}$. It is preferable that the total time of kneading be 30 seconds to 10 minutes and, when the curing agent is added, the curing time after the addition be 15 seconds to 5 minutes. The thermoplastic elastomer composite prepared by the method described above is formed into a film by shaping with a resin extruder or by calendar shaping. The film may be formed by a general method for forming a thermoplastic resin or a thermoplastic elastomer into a film.

The thin film of the thermoplastic elastomer composite obtained in this manner has a structure in which the elastomer is dispersed in discontinuous phases in a matrix of the thermoplastic resin. By employing a dispersed structure of such state, the range of the Young's modulus can be set to 1 to 500 MPa to provide appropriate rigidity as a tire component.

The thermoplastic resin or the thermoplastic elastomer composite may be shaped into a sheet or film, and buried alone inside the tire, or may be laminated to an adhesion layer in order to improve adhesion with the adjacent rubber. Specific examples of an adhesion polymer configuring the adhesion layer include ultrahigh molecular weight polyethylene (UHMWPE) having a molecular weight of 1 million or greater or preferably 3 million or greater, acrylate copolymers such as ethylene ethyl acrylate copolymer (EEA), ethylene methyl acrylate resin (EMA), and ethylene acrylic acid copolymer (EAA) and maleic anhydride adducts thereof, polypropylene (PP) and maleic acid modified product thereof, ethylene propylene copolymer and maleic acid modified product thereof, polybutadiene-based resin and maleic anhydride modified product thereof, styrene-butadiene-styrene copolymer (SBS), styrene-ethylene-butadiene-styrene copolymer (SEBS), fluorine-based thermoplastic resin, and polyester-based thermoplastic resin. These can be shaped into a sheet shape or a film shape by, for example, extrusion with a resin extruder according to a common method. The thickness of the adhesion layer is not particularly limited, but is preferably 5 µm to 150 µm since a smaller thickness contributes to reducing the weight of the tire.

The preferred embodiments of the present invention have been described above in detail. However, it should be understood that various changes, substitutions, and displacements are possible without departing from the spirit and scope of the present invention defined by the accompanying claims.

The invention claimed is:

1. A manufacturing method for a pneumatic tire including the steps of:
shaping a cylindrical film formed of a thermoplastic resin or a thermoplastic elastomer composite in which a thermoplastic resin is blended with an elastomer, folding the film into a sheet shape, laminating rubber layers on both surfaces of the folded film, opening the laminate of the film and the rubber layers into a cylindrical shape, fitting the laminate thus opened on a tire making drum, forming an uncured tire including the film as an air permeation preventing layer, and curing the uncured tire, the method wherein
when the rubber layers are laminated on the both surfaces of the folded film, positions of the rubber layers in a width direction are displaced from each other such that an end portion of one of the rubber layers is arranged to protrude from an end portion of the film and an end portion of the other one of the rubber layers is arranged on an inner side, in the width direction, of the protruding end portion of the one of the rubber layers, so that the protruding end portion of the one of the rubber layers is caused to cover the end portion of the other one of the rubber layers in a state where the laminate is fitted on the tire making drum.

2. The manufacturing method for a pneumatic tire according to claim 1, wherein a relation of L2−L1>3 mm is satisfied, where L1 represents a protrusion amount of the end portion of the other one of the rubber layers from the end portion of the film and L2 represents a protrusion amount of the end portion of the one of the rubber layers from the end portion of the film.

3. The manufacturing method for a pneumatic tire according to claim 2, wherein the protrusion amount L1 is set in a range from −50 mm to +2 mm and the protrusion amount L2 is set in a range from +3 mm to +60 mm.

4. The manufacturing method for a pneumatic tire according to claim 2, wherein the protrusion amount L1 is set in a range from −10 mm to +2 mm and the protrusion amount L2 is set in a range from +3 mm to +15 mm.

5. The manufacturing method for a pneumatic tire according to claim 1, wherein a thickness of the film is set in a range from 0.002 mm to 0.7 mm.

6. The manufacturing method for a pneumatic tire according to claim 5, wherein a thickness of each of the rubber layers is set in a range from 0.1 mm to 3.0 mm.

* * * * *